(12) United States Patent
Deshpande

(10) Patent No.: US 12,428,688 B2
(45) Date of Patent: Sep. 30, 2025

(54) METHODS FOR MODIFYING SURFACE PROPERTIES USING EXOTHERMIC REACTIVE POWDER MIXTURES

(71) Applicant: The United States of America, as represented by the Secretary of the Navy, Crane, IN (US)

(72) Inventor: Nishkamraj U. Deshpande, Novi, MI (US)

( * ) Notice: Subject to any disclaimer, the term of this patent is extended or adjusted under 35 U.S.C. 154(b) by 619 days.

(21) Appl. No.: 16/935,485

(22) Filed: Jul. 22, 2020

(65) Prior Publication Data

US 2021/0025018 A1    Jan. 28, 2021

Related U.S. Application Data

(60) Provisional application No. 62/877,024, filed on Jul. 22, 2019.

(51) Int. Cl.
| | |
|---|---|
| *C21D 3/06* | (2006.01) |
| *B23K 9/32* | (2006.01) |
| *C22F 1/10* | (2006.01) |

(52) U.S. Cl.
CPC ............... *C21D 3/06* (2013.01); *B23K 9/321* (2013.01); *C22F 1/10* (2013.01)

(58) Field of Classification Search
CPC ....................................................... C21D 3/06
See application file for complete search history.

(56) References Cited

U.S. PATENT DOCUMENTS

| | | | |
|---|---|---|---|
| 7,325,717 B2 | 2/2008 | Morikage et al. | |
| 8,653,400 B2 | 2/2014 | Tsuru et al. | |
| 2008/0257008 A1* | 10/2008 | Tsuru ..................... | C22C 38/44 148/590 |

(Continued)

FOREIGN PATENT DOCUMENTS

| | | | | |
|---|---|---|---|---|
| GB | 898232 A | * | 6/1962 | ................ C22F 1/00 |
| PL | 153927 B1 | * | 6/1991 | |
| SU | 967740 A | * | 10/1982 | ............. B23K 23/00 |

OTHER PUBLICATIONS

Manukyan, Khachatur V., et al. "Microstructure-reactivity relationship of Ti+ C reactive nanomaterials." Journal of Applied Physics 113.2 (2013): 024302. (Year: 2013).*

(Continued)

*Primary Examiner* — Jophy S. Koshy
*Assistant Examiner* — Joshua S Carpenter
(74) *Attorney, Agent, or Firm* — Naval Surface Warfare Center, Crane Division; Christopher Feigenbutz

(57) ABSTRACT

Various methods are provided to produce welded structures resistant to hydrogen induced cracking (HIC), improve wear resistance, reduce manufacturing steps including pre/post weld treatments, and improving corrosion resistance. Exemplary methods include using exothermic reactive powder mixtures on as-welded hot surface(s) during weld cooling which generate rapid exothermic reaction melting and hydrogen removal which results in reduction of hydrogen, creation of a wear/corrosion prevention or reduction layer, and a reduction of residual stresses effect in the weld initially formed in initial welding. Alternative embodiments can also employ post cooling re-heating and application of one or more alternative methods using exothermic reactive powders.

7 Claims, 2 Drawing Sheets

(56) References Cited

U.S. PATENT DOCUMENTS

2016/0228998 A1    8/2016  Feng et al.

OTHER PUBLICATIONS

Tharappel, Jose Tom, and Jalumedi Babu. "Welding processes for Inconel 718-A brief review." IOP Conference Series: Materials Science and Engineering. vol. 330. No. 1. IOP Publishing, 2018. (Year: 2018).*
English machine translation of SU 967740 A retrieved on Jan. 20, 2023 (Year: 1982).*
English machine translation of PL 153927 B1 retrieved on Jan. 20, 2023 (Year: 1991).*
ASTM International, "Standard Guide for Post-Coating Treatments of Steel for Reducing the Risk of Hydrogen Embrittlement" Jan. 2015.
Lee, Jonathan A; "Hydrogen Embrittlement" Apr. 2016, National Aeronautics and Space Administration (pp. 25 and 27).
Manukyan, Khachatur V; et al; "Microstructure-reactivity relationship of Ti + C reactive nanomaterials" Jan. 8, 2013, American Institute of Physics.

* cited by examiner

Step 201: Make reactive powders of Ti + C using High Energy Ball Milling

Step 301: Calculate the amount and thickness of reactive powders of Ti + C to be deposited on the weld surface as discussed below, using equations 1 and 2

Step 401: Weigh predetermined amount of the above reactive powder mixture

Step 501: Place the weighed powder in a powder application/spraying/delivery system Step 601: Prepare the steel components for arc welding Step 701: Arc weld the components using conventional welding filler rods Step 801: Calculate weight and thickness of the reactive powder to be deposited Step 901: Spray predetermined amount of reactive powder on the top of the weld surface as shown in schematic weld cross section given in Fig. 2 when the weld surface temperature is around 400-500 °C which is above the ignition temperature of the as high energy ball milled reactive Titanium + Carbon powder

Fig.1

METHODS FOR MODIFYING SURFACE PROPERTIES USING EXOTHERMIC REACTIVE POWDER MIXTURES

CROSS REFERENCE TO RELATED APPLICATIONS

This patent application claims priority to U.S. Provisional Application No. 62/877,024, titled "METHODS TO PRODUCE WELDED STRUCTURES RESISTANT TO HYDROGEN INDUCED CRACKING (HIC), IMPROVING WEAR RESISTANCE, REDUCING MANUFACTURING STEPS INCLUDING PRE/POST WELD TREATMENTS, AND IMPROVING CORROSION RESISTANCE USING METHODS INCLUDING EXOTHERMIC REACTIVE POWDER MIXTURES ON AS-WELDED HOT SURFACE(S) DURING WELD COOLING," filed on Jul. 22, 2019, the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,597) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD, BACKGROUND AND SUMMARY OF THE INVENTION

The present invention relates to material processing to improve resistance to hydrogen induced cracking (HIC), wear resistance, corrosion resistance, and improvements to manufacturing and work in process time. In particular, various embodiments relates to methods of prevention of HIC and embrittlement due to diffusion of hydrogen during arc welding process of high strength welded joints of steel in particular and other alloys sensitive to the problem of HIC.

Hydrogen diffuses from a manufacturing environment into weld areas of steel parts during welding process. This hydrogen diffusion in weld areas having sufficiently high level of residual stresses formed due to cooling cause cracking of these areas. Various solutions for preventing hydrogen embrittlement cracks of weld zones such as via reduction of diffusion of hydrogen or residual stress by heat treatment, reduction of residual stress by imparting plastic deformation, control of residual stress by imparting hydrogen trap sites and design of ingredients of the weld metal, etc. such as shown in, for example, Patent Publication No. 2014-8,653,400 B2. However, heating to a relatively high temperature, for example, 600° C., where residual stress is reduced requires excessive time for heating and cooling. Further, special and costly processing equipment is required for reducing the residual stress by plastic deformation. Moreover, attempts to alter metal materials requires a substantial increase in costs due to an addition of various alloy ingredients. For example, Patent Publications No. 2016-0228998 A1 and No. 2008-7,325,717 B2 discuss method of developing new weld alloys to prevent HIC. Other examples of attempts to address these problems include Patent Publication No. 2016-0,228,998 B2 which attempts improvements in weld materials and methods of causing the formation of austenite which acts as hydrogen trap sites in the weld metal to reduce diffusible hydrogen harmful for cracks or a method of reducing the residual stress at ordinary temperature by a low temperature transformation welding material. However, use of hydrogen trap sites creates disadvantages in attempts to create a high strength material. Further, a use of a low temperature transformation welding material also results in significant increases to manufacturing cost and effort. Post processing steps have been attempted which include baking or heating welds in post weld processing which adds to manufacturing and processing time. For example, Patent Publication No. 2014-8,653,400 B2 discusses use of post weld baking or heating. This publication further includes an equation describing time and temperature needed to heat the welds to bake out hydrogen diffused in the welds to dehydrogenate the welds. Similarly, the ASTM B850 standard also gives time and temperature required for baking out hydrogen from high strength steels, which gets diffused during various surface treatments. Various alloys referenced in, for example, the NASA/TM-2016-218602 report, exhibit hydrogen embrittlement, and have been mentioned to need pre and post weld heat treatments for preventing hydrogen embrittlement and reduction in residual stresses. Application of exothermic surface powder deposition process during welding described here can also be employed for achieving better weld properties for the alloys listed in NASA report.

Generally, embodiments include various methods to produce welded structures resistant to hydrogen induced cracking (HIC), improve wear resistance, reduce manufacturing steps including pre/post weld treatments, and improving corrosion resistance. Exemplary methods include using exothermic reactive powder mixtures on as-welded hot surface(s) during weld cooling which generate rapid exothermic reaction heat and localized melting and hydrogen removal which results in reduction of hydrogen, creation of a wear/corrosion prevention or reduction layer, and a reduction of residual stresses effect in the weld initially formed. Alternative embodiments can also employ post cooling re-heating and application of one or more alternative methods using exothermic reactive powders.

In particular, various embodiments can include methods to produce high strength welded steel structure/joints. Results of various embodiments can produce welds or structures that have improved hydrogen embrittlement crack resistance of weld and heat affected zone (HAZ), show a reduction/elimination of residual stresses without employing conventional methods such as pre/post weld heat treatment, and additionally provide a hard, corrosion and wear resistant plus weld hydrogen absorber/trapping coating on welded surface. Various embodiments avoids a need to employ conventional procedures of weld improvement, such as, using low hydrogen filler metals, or specially alloyed filler metals.

Exemplary methods can include spraying/applying a predetermined amount and type of reactive material powder/coating on the as welded surfaces consisting of both weld and HAZ, of the high strength steels during the weld cooling stage when it is hot, and is applied at a weld surface temperature corresponding to ignition temperature of reactive powder. Exemplary hot weld surface temperature preferably can be sufficient to provide enough heat to the reactive powder components on the hot weld surface, thus initiating a thermite type reaction releasing exothermic heat of reaction to the weld and HAZ. The released exothermic heat from the surface reaction products leads to; formation of a bond between a reaction product and underlying welded surface thus creating improved wear and corrosion resistance coating on the affected surface that either bakes out or absorbs hydrogen entrapped in an initial weld during welding and reduces residual stresses formed during weld cooling which further prevents or reduces hydrogen embrittlement cracking vulnerabilities.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 1 shows an exemplary flow diagram describing various process steps followed in application of reactive powder and forming a reactive product layer on a weld surface.

DETAILED DESCRIPTION OF THE DRAWINGS

Figure 2:
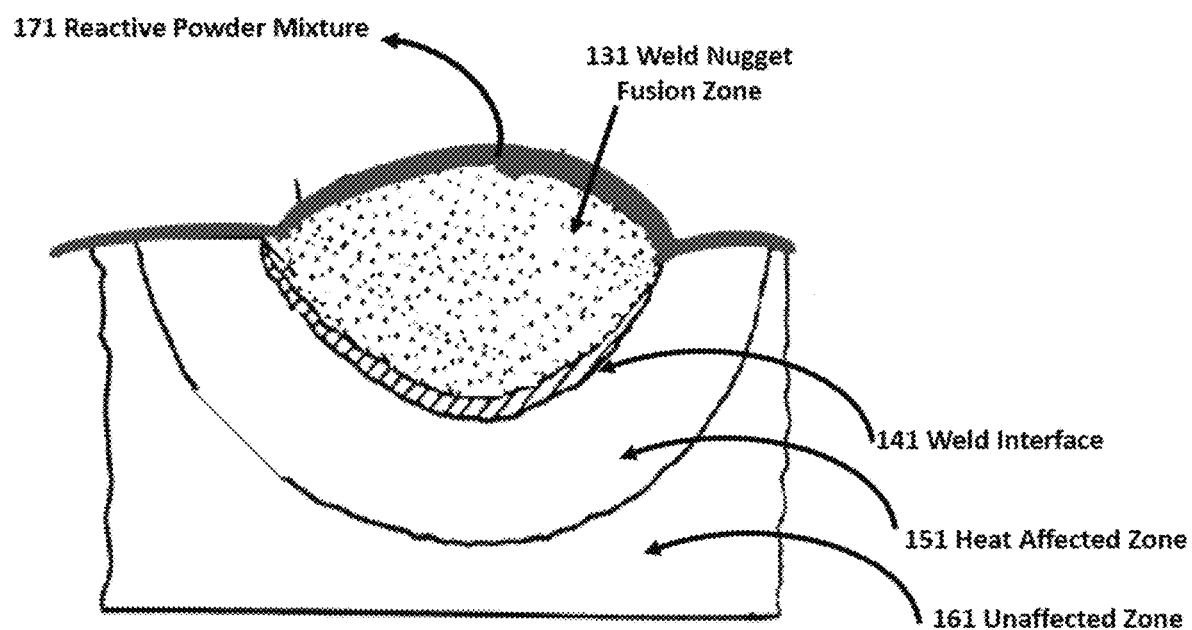
FIG. 2 shows a cross sectional view showing an exemplary formation of exothermic reactive powder layer dissipating heat to underlying weld and HAZ regions.

The embodiments of the invention described herein are not intended to be exhaustive or to limit the invention to precise forms disclosed. Rather, the embodiments selected for description have been chosen to enable one skilled in the art to practice the invention.

Generally, various embodiments of the invention provides methods including steps to produce high strength welded steel structure/joints, superior in hydrogen embrittlement crack resistance of weld and heat affected zone (HAZ), reduction/elimination of residual stresses without employing conventional methods such as pre/post weld heat treatment, and additionally providing a hard, corrosion and wear resistant plus weld hydrogen absorber/trapping coating on welded surface. This method, avoids having to employ conventional procedures of weld improvement, such as, using low hydrogen filler metals, or specially alloyed filler metals.

Embodiments can include a method involving spraying/applying a predetermined amount and type of exothermic reactive material powder/coating on the as welded surfaces consisting of both weld and HAZ, of the high strength metals or steels during the weld cooling stage when weld surface is hot, and is applied at a weld surface temperature corresponding to ignition temperature of reactive powder. Thus, the technique uses the heat of the hot surface of the weld to ignite the thermite exothermic reactive powder mixture. The exemplary hot weld surface temperature should be sufficient to provide enough heat to the reactive powder components on the hot weld surface, thus initiating a controlled thermite type reaction releasing exothermic heat of reaction to the weld and HAZ surfaces. In addition, the exothermic reaction is characteristically very fast consuming significantly less time in its completion and otherwise releasing a significant amount of heat in a very short time, thus reduces the cycle time, cost and be deposited in desired quantities. The exemplary released exothermic heat from the surface reaction delivered like a laser pulse energy of predetermined quantity, is sufficient enough to quickly either bake out or absorbs hydrogen entrapped in the weld during welding, and reduces the residual stresses formed during weld cooling, and prevents hydrogen embrittlement cracking, and simultaneously forms reaction products, creating a material bond between the reaction product and underlying welded surface. Exemplary reaction product can thereby be formed and bonded to the weld and HAZ surfaces which further create improved wear and corrosion resistance coating on the surface beneficial for future service life, has higher absorptivity for the diffused and trapped hydrogen which evolves from the weld and HAZ so as to be able to trap that hydrogen due to higher chemical affinity of the products to the hydrogen, thus stronger ability to draw or absorb weld produced hydrogen.

Generally, a high strength welded steel pipe can be produced with improved hydrogen embrittlement cracking resistance of weld metal produced by applying exothermic reactive powder mixture of Titanium and Carbon referenced in paper of Manukyan, whose ignition temperature is below 327° C. This nano sized Ti+C powder mixture can be ignited in few seconds after coming to an ignition temperature while coming in contact with hot weld surface going to through cooling. A sudden release of exothermic heat, e.g., 51 kcal/mole, of ignition reaction from Ti+C=TiC, is released to the cooling weld and HAZ surfaces of the steel in which the hydrogen was diffused from the environment. This suddenly released exothermic heat acts as a dehydrogenation heat treatment, which bakes out the entrapped hydrogen from various detrimental locations and eliminates residual stresses being built in those locations at the same time. Thus the suddenly released heat acts as in process weld heat treatment and eliminates pre or post weld heat treatment. In addition the reaction product TiC forms a hard, wear resistant layer which can absorb the hydrogen released from the weld and acts as a hydrogen trapping site. An amount of exothermic reactive powder can be controlled as needed. An amount of the exothermic heat suddenly released per unit surface area J/m² designated by term $e_s$ in the following equation can be associated with the weight and thickness of the reactive powder present per unit weld surface area, which is applied at the reaction ignition temperature designated as $T_i$ in equation 1.

$$T(x, t) - T_i = \frac{e_s}{k\sqrt{\pi t/\alpha}} \exp\left(-\frac{x^2}{4\alpha t}\right) \quad \text{Equation 1}$$

where: (x, t) is the transient temperature inside the weld and HAZ at various locations and distances x; t=time in seconds for dehydrogentation; α=thermal diffusivity of steel weld m²/sec; and k=Thermal Conductivity of steel weld J/msC.

In at least some embodiments, it is assumed that exothermic heat is completely released to the weld and HAZ per unit area like a laser pulse energy. Patent Publication No. 2014-8,653,400 B2 provides exemplary information on a heating temperature T [° C.] of an exemplary dehydrogenation treatment is in the range of 150 to 500° C., and the heating time is t[s] or more as described in Equation 2 from the weld metal height×mm and heating temperature T.

$$t = \frac{\left(\frac{x}{16}\right)^2}{\exp\left(-\frac{957}{273+T}\right)} \quad \text{Equation 2}$$

Referring to FIG. 1, at Step 201: Make reactive powders of Ti+C using High Energy Ball Milling; At Step 301: Calculate the amount and thickness of reactive powders of Ti+C to be deposited on the weld surface using, e.g., Equations 1 and 2 given in method section; Step 401: Weigh predetermined amount of the above reactive powder mixture; at Step 501: Place the weighed powder in a powder application/spraying/delivery system; at Step 601: Prepare two or more steel components for arc welding; at Step 701: Arc weld the components using welding filler rods to produce a weld surface; at Step 801: Calculate weight and thickness of the reactive powder to be deposited based on at least one of the following factors: desired exothermic response, degree of hydrogen mitigation desired, depth of the steel components targeted for hydrogen removal, thickness of resulting exothermic reaction protective melt or treated zone, and heating duration; at Step 901: Spray predetermined amount of reactive powder on a top of the weld when the weld surface temperature is at or between 400-500° C., is above an ignition temperature of the as high energy ball milled reactive Titanium+Carbon powder, or is above an ignition temperature of the reactive powder.

FIG. 2 shows a cross sectional view showing an exemplary formation of exothermic reactive powder layer dissipating heat to underlying weld and HAZ regions. In particular, FIG. 2 shows an unaffected zone 161 which is an area of welded materials which has not been impacted by welding (e.g., subjected to formation of weld induced hydrogen), a heat affected zone 151, a weld interface 141, a weld nugget fusion zone 131, and a reactive powder mixture section 171.

Although the invention has been described in detail with reference to certain preferred embodiments, variations and modifications exist within the spirit and scope of the invention as described and defined in the following claims.

The invention claimed is:

1. A method of producing a welded workpiece comprising a weld zone, a heat affected zone (HAZ), and a TiC coating, said method comprising:
   using ball milling to form a reactive powder mixture comprising Titanium and Carbon;
   calculating a desired amount and thickness of said reactive powder mixture to be deposited on a weld surface using formula:

$$T(x, t) - T_i = \frac{e_s}{\kappa \sqrt{\pi t / \alpha}} \exp\left(-\frac{x^2}{4\alpha t}\right),$$

where: (x, t) is a transient temperature inside said weld and said HAZ at various locations and distances x; $e_s$ is an amount of exothermic heat suddenly released per unit surface area $J/m^2$; t is time in seconds for dehydrogentation; $\alpha$ is thermal diffusivity of steel weld $m^2/sec$; and k is thermal conductivity of steel weld J/msC;

determining said weld surface height x mm and calculating a heating time of said reactive powder mixture to be deposited on said weld surface using formula:

$$t = \frac{\left(\frac{x}{16}\right)^2}{\exp\left(\frac{957}{273 + T}\right)};$$

weighing a predetermined amount of said reactive powder mixture based on said calculations;
providing metal sections and welding said metal sections to produce a weld section comprising a weld surface;
applying said predetermined amount of said reactive powder mixture to said weld surface when said weld surface is above an ignition temperature of said reactive powder mixture;
wherein said reactive powder mixture ignites, causing a sudden release of exothermic heat, a dehydrogentation reaction that removes entrapped hydrogen from said weld section, and forms a layer over said weld surface comprising TiC.

2. The method as in claim 1, wherein said metal sections comprise Inconel 718 alloy.

3. The method as in claim 1, wherein said metal sections comprise steel sections.

4. The method as in claim 1, wherein said sudden release of exothermic heat is 51 kcal/mole.

5. The method as in claim 1, wherein said reactive powder mixture is delivered to said weld section with a delivery device.

6. The method as in claim 1, wherein said reactive powder mixture is sprayed on a top of said weld section.

7. The method as in claim 5, wherein said delivery device is a sprayer.

* * * * *